(12) United States Patent
Sadhwani et al.

(10) Patent No.: US 10,447,921 B2
(45) Date of Patent: Oct. 15, 2019

(54) SYSTEM AND METHOD FOR CONTROLLING CAPTURE OF IMAGES

(71) Applicant: SONY CORPORATION, Tokyo (JP)

(72) Inventors: Hemant Sadhwani, Bangalore (IN); Pramod Chintalapoodi, San Diego, CA (US); Madhvesh Sulibhavi, Bangalore (IN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/830,954

(22) Filed: Aug. 20, 2015

(65) Prior Publication Data

US 2017/0054899 A1    Feb. 23, 2017

(51) Int. Cl.
*G03B 7/00* (2014.01)
*H04N 5/232* (2006.01)
*G06K 9/00* (2006.01)

(52) U.S. Cl.
CPC ..... *H04N 5/23222* (2013.01); *G06K 9/00684* (2013.01); *H04N 5/23206* (2013.01); *H04N 5/23245* (2013.01)

(58) Field of Classification Search
CPC .................................. H04N 5/235; G03B 7/00
USPC ............................... 396/213, 242; 348/221.1
See application file for complete search history.

(56) References Cited

U.S. PATENT DOCUMENTS

| 7,822,327 | B2 | 10/2010 | Chien et al. | |
|---|---|---|---|---|
| 2003/0076312 | A1* | 4/2003 | Yokoyama | H04N 1/3873 |
| | | | | 345/204 |
| 2004/0118928 | A1* | 6/2004 | Patel | G06K 7/0004 |
| | | | | 235/472.01 |
| 2006/0184574 | A1* | 8/2006 | Wu | G06F 17/30265 |
| 2012/0113272 | A1 | 5/2012 | Hata | |
| 2012/0224787 | A1 | 9/2012 | Imai | |
| 2012/0321131 | A1 | 12/2012 | Kobayashi | |

(Continued)

FOREIGN PATENT DOCUMENTS

| CN | 101478639 A | 7/2009 |
|---|---|---|
| CN | 102457665 A | 5/2012 |
| CN | 102843511 A | 12/2012 |

(Continued)

OTHER PUBLICATIONS

Nikon, "Digital Compact Camera Nikon Coolpix S9700/S9600/S32", (http://www.nikon.com/news/2014/0207_cpx_01.htm), Feb. 7, 2014, p. 5, Nikon Corporation, Tokyo, Japan.

(Continued)

*Primary Examiner* — Clayton E. LaBalle
*Assistant Examiner* — Fang-Chi Chang
(74) *Attorney, Agent, or Firm* — Chip Law Group

(57) ABSTRACT

Various aspects of a system and method to control capture of images are disclosed herein. In accordance with an embodiment, the method includes capture of a first image of a user-selected scene by an electronic device. The user-selected scene comprises one or more objects. A scene mode from a pre-stored set of scene modes is determined by the electronic device to capture a plurality of images of the user-selected scene. The determination of the scene mode is based on an object type of the one or more objects and a geo-location of the electronic device. The scene mode is determined when the first image is captured or when image data corresponding to the user-selected scene is received.

27 Claims, 6 Drawing Sheets

(56) References Cited

U.S. PATENT DOCUMENTS

2014/0049652 A1* 2/2014 Moon ............... H04N 9/8233
348/207.1
2015/0029349 A1* 1/2015 Ben Israel ......... H04N 5/23277
348/208.4

FOREIGN PATENT DOCUMENTS

| CN | 103595911 A | 2/2014 |
|----|----|----|
| EP | 2536120 A1 | 12/2012 |
| EP | 2698980 A2 | 2/2014 |
| JP | 2007-258927 A | 10/2007 |
| JP | 2009-077157 A | 4/2009 |
| JP | 2010-199727 A | 9/2010 |
| JP | 2014-168207 A | 9/2014 |
| JP | 5733952 B2 | 6/2015 |
| JP | 5995520 B2 | 9/2016 |
| KR | 10-2014-0023705 A | 2/2014 |
| WO | 2013/187108 A1 | 12/2013 |

OTHER PUBLICATIONS

Canon, "Canon-Power Shot", (http://www.usa.canon.com/cusa/consumer/standard_display/PS_Advantage_HD), 2015, p. 6, Canon U.S.A. Inc.

Sony Mobile Communications, "Five Things You Might Not Know About Xperia Z1's Camera", (http://blogs.sonymobile.com/2013/11/01/five-things-you-might-not-know-about-xperia-z1s-camera/), Nov. 1, 2013, Sony Mobile Communications Inc.

Extended European Search Report of EP Patent Application No. 16837477.5, dated Feb. 12, 2019, 11 pages.

Office Action for JP Patent Application No. 2018-505417, dated Mar. 6, 2019, 04 pages of Office Action and 05 pages of English Translation.

Office Action for KR Patent Application No. 10-2018-7003371, dated Apr. 24, 2019, 7 pages of Office Action and 12 pages of English Translation.

* cited by examiner

SYSTEM AND METHOD FOR CONTROLLING CAPTURE OF IMAGES

FIELD

Various embodiments of the disclosure relate to a system and method to control capture of images. More specifically, various embodiments of the disclosure relate to a system and method to control capture of images based on a geo-location of an electronic device.

BACKGROUND

Advancements in the field of digital technology have extended the functionalities of various electronic devices and associated applications. In certain scenarios, a user may want to capture an image of an important moment or a picturesque scene from a certain location by use of an electronic device, such as a smartphone or a camera. The user may either manually select a scene mode or use an in-built auto-scene detection mode that may be provided by a manufacturer of the electronic device. However, the scene captured by use of the in-built auto-scene detection mode of the electronic device may not be an exact or ideal reproduction of the picturesque scene. Advanced capabilities and functionalities may be required by the electronic device to provide a professional photography experience to a user. An enhanced system may be required that may capture at least one ideal image at a significant moment with a specific degree of certainty.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method to control capture of images substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
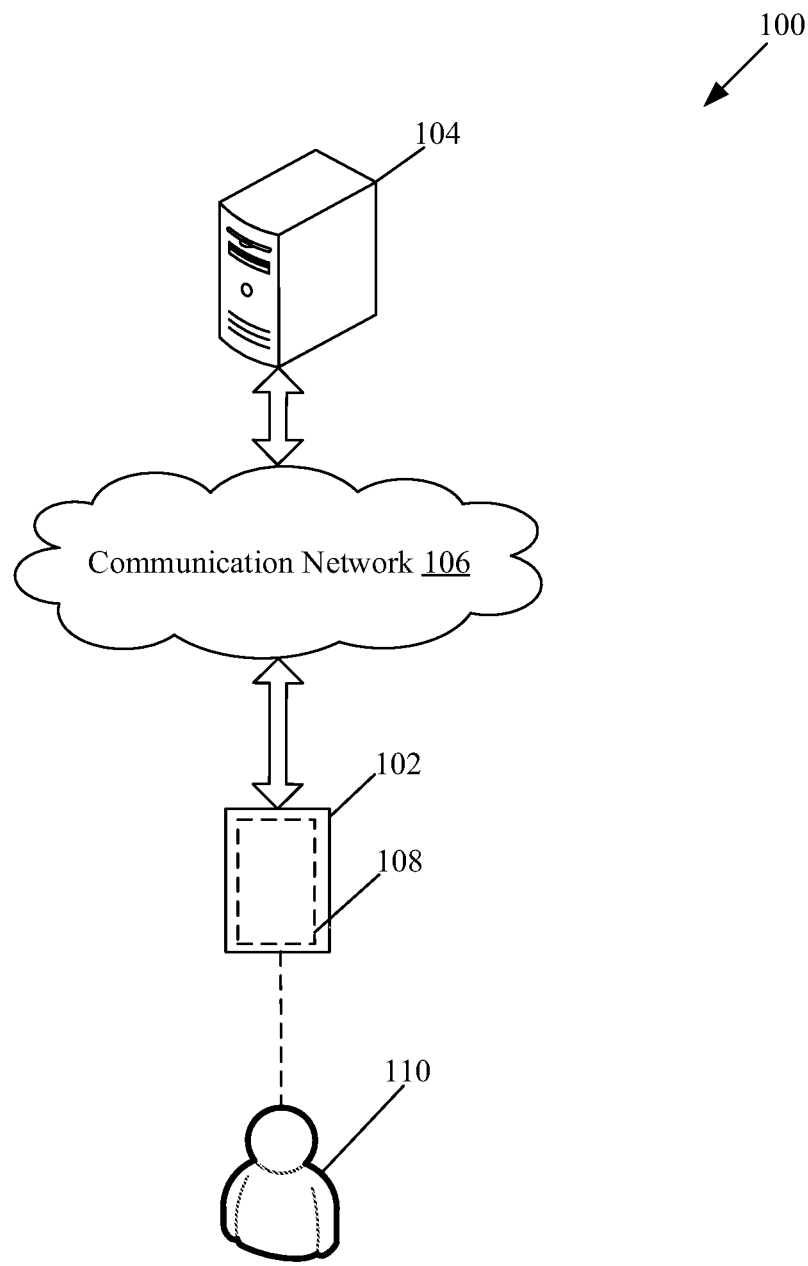
FIG. 1 is a block diagram that illustrates a network environment, in accordance with an embodiment of the disclosure.

The following described implementations may be found in disclosed system and method that controls capture of images. Exemplary aspects of the disclosure may comprise a method that may capture a first image of a user-selected scene. The user-selected scene may comprise one or more objects. A scene mode from a pre-stored set of scene modes may be determined to capture a plurality of images of the user-selected scene. The scene mode may be determined based on an object type of the one or more objects and a geo-location of the electronic device when the first image is captured.

In accordance with an embodiment, the pre-stored set of scene modes may comprise an indoor scene mode, a party scene mode, an outdoor scene mode, a night portrait scene mode, a portrait scene mode, a beach scene mode, a snow scene mode, a landscape scene mode, a waterfall scene mode, a birthday scene mode, a sports action scene mode, a bird-watch scene mode, and/or a user-defined scene mode. An image buffer may be provided that may be configured to store the captured first image.

In accordance with an embodiment, the object type of the one or more objects may be determined in the user-selected scene based on analysis of the captured first image stored in the image buffer. The analysis may occur before the capture of the plurality of images. An input may be received to capture the plurality of images. Each of the plurality of images may be captured by use of a user-defined photography setting for the determined scene mode. The photography setting may comprise a set of photography setting parameters. The set of photography setting parameters may comprise shutter speed, aperture size, lens focal length, flash operation, red-eye correction, white balance, automatic gain setting, International Organization of Standardization (ISO) setting to adjust sensitivity to light, and/or a shooting mode to establish aperture priority with respect to shutter-priority or manual control.

In accordance with an embodiment, each of the photography settings associated with the plurality of images captured by the electronic device may be tagged with metadata. The metadata may comprise a time of capture of the plurality of images, an orientation of the electronic device, the geo-location of the electronic device, the determined scene mode, and/or the object type of the one or more objects in the user-selected scene.

In accordance with an embodiment, a user input may be received that corresponds to a selection of one or more of the plurality of images associated with corresponding one or more photography settings tagged with the metadata. The one or more photography settings tagged with the metadata may be communicated to a server based on the selection of the one or more of the plurality of images.

In accordance with an embodiment, a new user-defined scene mode that corresponds to the user-selected scene may be created. The new user-defined scene mode may be created based on the selection of one or more of the plurality of images. The new user-defined scene mode may correspond to a particular group of photography settings used to capture the user-selected scene by the electronic device at the geo-location. The pre-stored set of scene modes may be updated based on the created new user-defined scene mode.

In accordance with an exemplary aspect of the disclosure, another method may be provided that may be implemented in the electronic device. The method may include receipt of image data of a user-selected scene that may be visualized via the electronic device. The user-selected scene may comprise one or more objects. A scene mode from a pre-stored set of scene modes to capture one or more images of the user-selected scene may be determined. The scene mode may be determined based on an object type of the one or more objects and a geo-location of the electronic device when the image data that corresponds to the user-selected scene is received.

In accordance with an exemplary aspect of the disclosure, another method may be provided that may be implemented in a server. The method may include receipt of one or more photography settings tagged with metadata from the electronic device. A new user-defined scene mode may be created based on the received one or more photography settings. The new user-defined scene mode may correspond to the particular group of photography settings used to capture the user-selected scene by the electronic device at the geo-location. A pre-stored set of scene modes may be updated at the server based on the created new user-defined scene mode.

In accordance with an embodiment, a user associated with the electronic device or another electronic device may retrieve the created new user-defined scene mode or the one or more photography settings from the server based on a time of capture of the plurality of images, an orientation of the electronic device, the geo-location of the electronic device, the determined scene mode, and/or the object type of one or more objects determined by the electronic device in the user-selected scene.

FIG. 1 is a block diagram that illustrates a network environment, in accordance with an embodiment of the disclosure. With reference to FIG. 1, there is shown a network environment 100. The network environment 100 may include an electronic device 102, one or more cloud-based resources, such as a server 104, a communication network 106, a User Interface (UI) 108, and one or more users, such as a user 110. The electronic device 102 may be communicatively coupled with the server 104, via the communication network 106. The electronic device 102 may be associated with the user 110.

The electronic device 102 may comprise suitable logic, circuitry, interfaces, and/or code that may be configured to determine a scene mode from a pre-stored set of scene modes at the electronic device 102, based on at least a geo-location of the electronic device 102. The electronic device 102 may be further configured to store an image-capturing application. The image-capturing application may render the UI 108 at the electronic device 102. Examples of the electronic device 102 may include, but are not limited to, a smartphone, a camera, a tablet computer, a laptop, and/or a wearable electronic device (such as a smart glass).

The server 104 may comprise suitable logic, circuitry, interfaces, and/or code that may be configured to receive requests from one or more subscribed devices, such as the electronic device 102. The server 104 may be configured to store multiple photography settings received from one or more electronic devices, such as the electronic device 102. The server 104 may be a web server, a database server, a file server, an application server, a cloud based sever, or a combination thereof. The server 104 may be implemented by use of several technologies that are well known to those skilled in the art.

The communication network 106 may include a medium through which the electronic device 102 may communicate with one or more servers, such as the server 104. Examples of the communication network 106 may include, but are not limited to, the Internet, a cloud network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the network environment 100 may be configured to connect to the communication network 106, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long Term Evolution (LTE), and/or Bluetooth (BT) communication protocols.

The UI 108 may be rendered at a display screen of the electronic device 102. The UI 108 may correspond to the image-capturing application stored at the electronic device 102. The UI 108 may comprise one or more UI elements that may enable the user 110 to configure a new scene mode, as per preferences of the user 110. Based on the configuration, various user-defined scene modes, different from the default scene modes, may be created. Such user-defined scene modes may be dependent upon lifestyle, user image-capturing behavior, and/or certain landmarks, tourist locations or other locations, preferred by the user 110.

In accordance with an embodiment, the UI 108 may facilitate configuration of various photography settings for the pre-stored set of scene modes, defined by the user 110. For example, the user 110 may configure certain number of photography settings, such as a group of ten photography settings, for a certain scene mode, such as the sports action scene mode. Each photography setting may comprise a different set of photography setting parameters.

In operation, the electronic device 102 may be configured to detect intent of an associated user, such as the user 110, to capture a plurality of images of a scene selected by the user 110 (hereinafter referred to as "user-selected scene"). The intent of the user 110 may be detected by the electronic device 102 based on one or more events. For example, the user 110 may launch the image-capturing application at the electronic device 102 and point the electronic device 102 towards the user-selected scene. The electronic device 102 may detect occurrences of such one or more events (such as pointing of the electronic device 102 towards the user-selected scene) to detect the intent of the user 110 to capture the plurality of images of the user-selected scene.

In accordance with an embodiment, the electronic device 102 may be configured to receive image data corresponding to the user-selected scene. The user-selected scene may comprise one or more objects. The image data may be received when the electronic device 102 is pointed towards the user-selected scene. The electronic device 102 may be configured to analyze the image data corresponding to the user-selected scene from an image buffer. The image buffer may temporally store the image data corresponding to the user-selected scene. The image buffer may be implemented by a primary memory, such as a random access memory or a cache memory, of the electronic device 102.

In accordance with an embodiment, the electronic device 102 may be configured to determine an object type of the one or more objects, based on the analysis. The object type may be determined when the electronic device 102 is pointed towards the user-selected scene and/or when the intent of the user 110 is detected to capture the plurality of images of the user-selected scene. In accordance with an embodiment, the electronic device 102 may be configured to determine a scene mode based on the determined object type of the one or more objects and a geo-location of the electronic device 102. The determination of the scene mode and the geo-location of the electronic device 102 may occur when the electronic device 102 is pointed towards the user-selected scene and/or when the intent of the user 110 is detected to capture the plurality of images of the user-selected scene.

In accordance with an embodiment, the electronic device 102 may be configured to receive an input from the user 110 to capture the plurality of images. In response to the input received from the user 110, the electronic device 102 may be configured to capture a first image of the user-selected scene. The first image may comprise one or more objects. The first image may be captured in a default scene setting. In accordance with an embodiment, the first image may be captured dynamically without the user input, based on the detection of the user intent to capture the plurality of images. In accordance with an embodiment, the electronic device 102 may comprise the image buffer configured to store the captured first image of the user-selected scene or the image data corresponding to the user-selected scene before the capture of the first image. In accordance with an embodiment, the captured first image may also be stored at a secondary memory, such as a hard disk drive (HDD).

In accordance with an embodiment, the electronic device 102 may be configured to analyze the captured first image stored in the image buffer. Based on the analysis of the captured first image, the electronic device 102 may be configured to determine an object type of the one or more objects. The object type may be determined before the capture of other images of the plurality of images.

In accordance with an embodiment, the electronic device 102 may be configured to determine a scene mode from the pre-stored set of scene modes. The pre-stored set of scene modes may comprise one or more user-defined scene modes and/or a manufacturer defined scene modes (hereinafter referred to as "default scene modes"). The electronic device 102 may determine the scene mode based on the determined object type of the one or more objects and a geo-location of the electronic device 102 when the first image is captured. In accordance with an embodiment, the determined scene mode may be used to capture the other images of the plurality of images of the user-selected scene.

In accordance with an embodiment, the electronic device 102 may be configured to utilize different photography settings associated with the determined scene mode to capture the plurality of images. The photography settings may be user-defined and stored at the electronic device 102. For example, the user 110 may configure a certain number of photography settings, such as a group of ten photography settings, prior to capture of the plurality of images. Each user-defined photography setting may comprise a set of photography setting parameters. Examples of the set of photography setting parameters may include, but are not limited to, shutter speed, aperture mechanism or size, lens focal length, flash operation, red-eye correction, white balance, and/or automatic gain setting, a shooting mode (which establishes aperture priority with respect to shutter-priority), manual control, and ISO setting (to adjust sensitivity to light for the electronic device 102). A variation of values of one or more photography setting parameters of the set of photography setting parameters may result in a distinct and/or varied effect in the captured plurality of images. In accordance with an embodiment, different values for each of the set of photography setting parameters may be pre-defined by the user 110 for each of the photography settings.

In accordance with an embodiment, the electronic device 102 may be configured to tag metadata with each of the user-defined photography settings used to capture the plurality of images. The metadata may comprise a time of capture of the plurality of images, an orientation of the electronic device 102, the detected geo-location of the electronic device 102, the determined scene mode, and/or the determined object type of the one or more objects in the user-selected scene. In accordance with an embodiment, the electronic device 102 may further associate each of the plurality of images with a corresponding user-defined photography setting tagged with the metadata. An associative relationship between each of the plurality of images and the corresponding tagged user-defined photography setting may be established.

In accordance with an embodiment, after the capture of the plurality of images, the electronic device 102 may be configured to store the captured plurality of images with the determined scene mode. As described above, each image of the plurality of images may be captured by use of different photography settings. For example, a single user input, such as a touch-based input, provided by the user 110 may trigger the electronic device 102 to capture fifteen images in a quick succession. The fifteen images may have different visual effects as compared to each other. The different visual effects may be due to use of a different user-defined photography setting for each of the fifteen images for the determined scene mode. The user-defined photography settings may be different from the photography settings (camera settings) provided by the manufacturer of the electronic device 102. Thus, the same user-selected scene, captured by use of different user-defined photography settings may increase degree of certainty for capture of at least one optimal image out of the fifteen images.

In accordance with an embodiment, the electronic device 102 may be configured to control display of the plurality of images, captured via the UI 108 at the electronic device 102. The captured plurality of images may be displayed simultaneously with the corresponding tagged photography settings. The simultaneous display may enable any user, for example, a professional photographer, or a novice user, to identify an ideal photography setting based on visualization of the captured plurality of images. For example, at least one of the captured images may be an optimal image (a best shot) for the determined geo-location and the object-type of the one or more objects in the user-selected scene. The user 110 may select the photography setting used to capture the optimal image for later use. The selected photography setting may be shared with another electronic device associated with another use, such as via a SMS, via the communication network 106. The selected photography setting tagged with the metadata may be shared or uploaded to the server 104 for use by the other user for the determined geo-location.

In accordance with an embodiment, the electronic device 102 may be configured to receive another user input that corresponds to a selection of one or more of the plurality of images captured by the electronic device 102, via the UI 108. The electronic device 102 may be configured to communicate the tagged user-defined photography settings associated with the selected one or more of the plurality of images to the server 104. Similarly, other electronic devices may also communicate other tagged user-defined photography settings associated with one or more of other plurality of images to the server 104.

In accordance with an embodiment, the server 104 may be configured to receive and store the tagged user-defined photography settings from the one or more electronic devices, such as the electronic device 102. The server 104 may be configured to create a new user-defined scene mode based on the received tagged user-defined photography settings. The new user-defined scene mode may correspond to a particular group of photography settings (such as the group of ten photography settings, as described above) used to capture the user-selected scene by the electronic device 102 at the determined geo-location.

In accordance with an embodiment, the server 104 may be configured to update a pre-stored set of scene modes at the server 104, based on the new user-defined scene mode. For example, the new user-defined scene mode may be added to the pre-stored set of scene modes at the server 104. In accordance with an embodiment, the server 104 may communicate the new user-defined scene mode to the electronic device 102. Such a communication may add the new user-defined scene mode to the pre-stored set of scene modes at the electronic device 102. The addition of the new user-defined scene mode may update the count of the scene modes of the pre-stored set of scene modes at the electronic device 102. In accordance with an embodiment, instead of the server 104, the electronic device 102 may be configured to create and/or update the new user-defined scene mode.

In accordance with an embodiment, the user 110 or another user, associated with the electronic device 102 or another electronic device, respectively, may retrieve the new user-defined scene mode with the tagged one or more user-defined photography settings from the server 104. The retrieval may be based on one or more of a time of capture of at least the first image of the plurality of images by the another electronic device, a time of detection of the intent of the user 110 to capture the plurality of images, the orientation of the another electronic device, the determined geo-location of the another electronic device, the determined scene mode, the determined object type of one or more objects in the first image of the user-selected scene and/or the image data corresponding to the user-selected scene. In accordance with an embodiment, the retrieval may occur when the first image of the plurality of images is captured. In accordance with an embodiment, the retrieval may occur when the electronic device 102 is pointed towards the user-selected scene and/or when the intent of the user 110 is detected to capture the plurality of images of the user-selected scene. In accordance with an embodiment, the retrieval may occur based on an input provided by the user 110, via the UI 108, at the time of configuration of the user-defined photography settings. In accordance with an embodiment, the retrieval may occur based on analysis of the user-defined photography settings stored at the electronic device 102. The scenarios, under which the retrieval and/or other operations may occur, are described in detail in FIG. 2.

Figure 2:
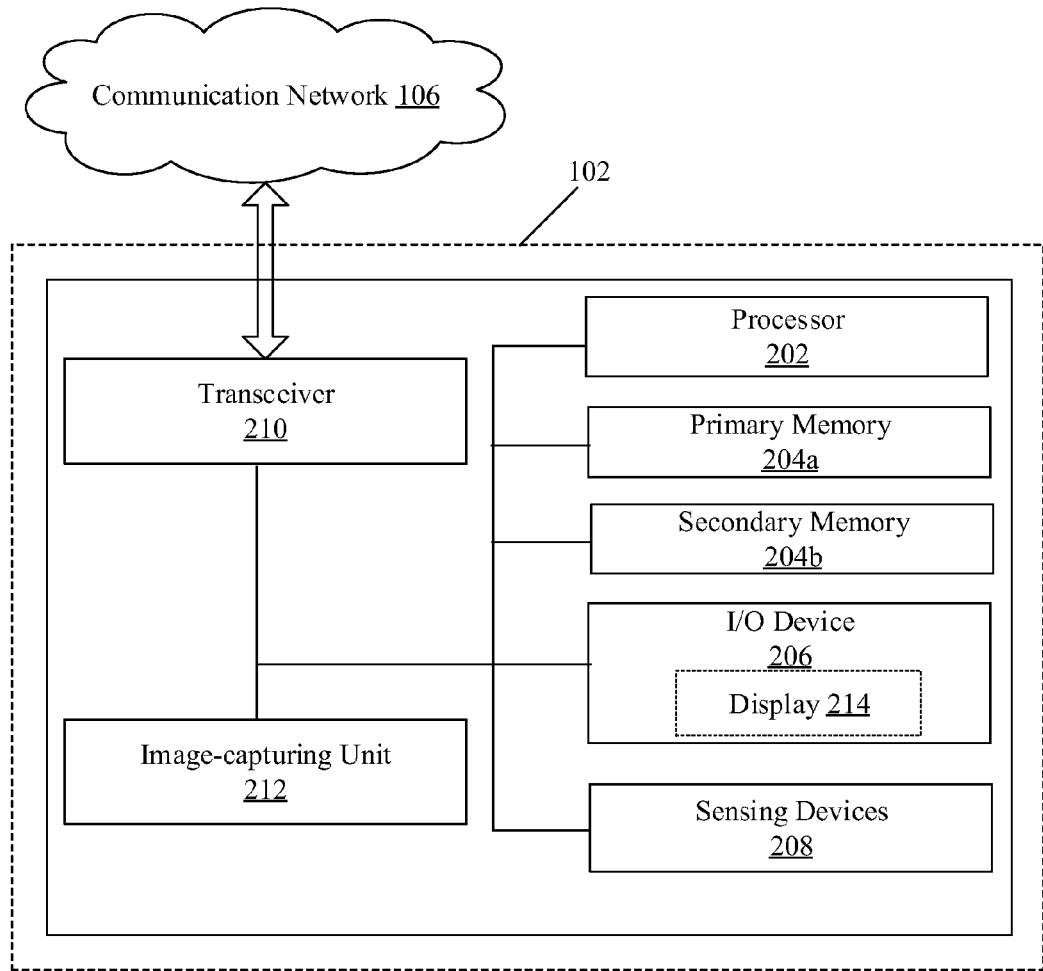
FIG. 2 is a block diagram that illustrates an exemplary electronic device, in accordance with an embodiment of the disclosure.

FIG. 2 is a block diagram that illustrates an exemplary electronic device, in accordance with an embodiment of the disclosure. FIG. 2 is explained in conjunction with elements from FIG. 1. With reference to FIG. 2, there is shown the electronic device 102. The electronic device 102 may comprise one or more processors (such as a processor 202), one or more memory units (such as a primary memory 204a and a secondary memory 204b), and one or more input/output (I/O) devices (such as I/O device 206, sensing devices 208).

The electronic device 102 may further comprise a transceiver 210 and an image-capturing unit 212. The I/O device 206 may include a display 214. With reference to FIG. 2, there is further shown the communication network 106 of FIG. 1.

The processor 202 may be communicatively coupled to the primary memory 204a, the secondary memory 204b, the I/O device 206, the sensing devices 208, the transceiver 210, and the image-capturing unit 212. The transceiver 210 may be configured to communicate with one or more servers, such as the server 104, via the communication network 106.

The processor 202 may comprise suitable logic, circuitry, interfaces, and/or code that may be configured to execute a set of instructions stored in the primary memory 204a and/or the secondary memory 204b. The processor 202 may be further configured to receive input that may launch the image-capturing application, pre-stored in the primary memory 204a and/or the secondary memory 204b. The processor 202 may be implemented based on a number of processor technologies known in the art. Examples of the processor 202 may be an X86-based processor, X86-64-based processor, a Reduced Instruction Set Computing (RISC) processor, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The primary memory 204a may comprise suitable logic, circuitry, and/or interfaces that may be configured to temporarily store image data corresponding to the user-selected scene when the electronic device 102 is pointed towards the user-selected scene and/or when the intent of the user 110 is detected to capture the plurality of images of the user-selected scene. The primary memory 204a may be further configured to temporarily store the captured first image of the plurality of images for analysis. Examples of implementation of the primary memory 204a may include, but are not limited to, Random Access Memory (RAM), Dynamic Random Access Memory (DRAM), Static Random Access Memory (SRAM), Thyristor Random Access Memory (T-RAM), Zero-Capacitor Random Access Memory (Z-RAM), cache memory, and/or other volatile memory.

The secondary memory 204b may comprise suitable logic, circuitry, and/or interfaces that may be configured to store a machine code and/or a set of instructions executable by the processor 202. The secondary memory 204b may be configured to store one or more user profile information and corresponding photography settings configured by one or more users. The secondary memory 204b may be further configured to store user-defined scene mode settings and other scene modes. The secondary memory 204b may be further configured to store the set of scene modes. The set of scene modes may be stored in an associative relationship with corresponding geo-location data, such as certain landmarks, tourist locations or other locations, preferred by the user 110. The secondary memory 204b may be further configured to store operating systems and associated applications. Examples of implementation of the secondary memory 204b may include, but are not limited to, Read Only Memory (ROM), a flash memory, Hard Disk Drive (HDD), a Solid-State Drive (SSD), a Secure Digital (SD) card, and/or a removable media drive.

The I/O device 206 may comprise suitable logic, circuitry, interfaces, and/or code that may be configured to receive an input from and provide an output to the user 110. The I/O device 206 may include various input and output devices that may be configured to facilitate a communication between the processor 202 and the user 110. Examples of the input devices may include, but are not limited to, a shutter button, a record button on the electronic device 102 (such as a camera), a software button on the UI 108, the image-capturing unit 212, a camcorder, a touch screen, a microphone, a motion sensor, and/or a light sensor. Examples of the output devices may include, but are not limited to, the display 214, a projector screen, and/or a speaker.

The sensing devices 208 may comprise one or more sensors that include a suitable logic, circuitry, interfaces, and/or code to detect physical or quantitative attributes and provide corresponding output as sensor data. The physical or quantitative attributes may include, but are not limited to, orientation, motion, contact, proximity, geo-magnetic field, and/or ambient lighting. The one or more sensors in the sensing devices 208 may be configured to detect an orientation and a geo-location of the electronic device 102. The one or more sensors in the sensing devices 208 may be further configured for tap detection and/or gesture detection. The one or more sensors in the sensing devices 208 may be further configured to aid in capture of one or more scenes, such as images and/or videos, by the image-capturing unit 212. Examples of the one or more sensors may include, but are not limited to, an accelerometer, a global positioning system (GPS) sensor, a compass or magnometer, an ambient light sensor, a tricorder, a gyroscope, a proximity sensor, an image sensor, a lux meter, a touch sensor, and/or an infrared sensor.

The transceiver 210 may comprise suitable logic, circuitry, interfaces, and/or code that may be configured to communicate with one or more servers, such as the server 104, via the communication network 106 (as shown in FIG. 1). The transceiver 210 may implement known technologies to support wired or wireless communication of the electronic device 102 with the communication network 106. The transceiver 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The transceiver 210 may communicate via wireless communication with the communication network 106. The wireless communication may use one or more of the communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The image-capturing unit 212 may comprise suitable logic, circuitry, interfaces, and/or code that may be configured to capture one or more scenes, such as a picturesque scene. The image-capturing unit 212 may refer to an in-built camera or an image sensor of the electronic device 102, such as a smartphone. The image-capturing unit 212 may comprise a viewfinder that may be configured to compose and/or focus the user-selected scene captured by the image-capturing unit 212. The image-capturing unit 212 may be configured to store the captured plurality of images that corresponds to the user-selected scene in a local buffer and/or the secondary memory 204b, under the control of the processor 202.

The display 214 may comprise suitable logic, circuitry, interfaces, and/or code that may be configured to render the UI 108 of the electronic device 102. The display 214 may be realized through several known technologies, such as Cathode Ray Tube (CRT) based display, Liquid Crystal Display (LCD), Light Emitting Diode (LED) based display, Organic LED display technology, Retina display technology, and/or the like. In accordance with an embodiment, the display 214 may be capable of receiving input from the user 110. In such a scenario, the display 214 may be a touch screen that enables the user 110 to provide the input. The touch screen may correspond to at least one of a resistive touch screen, a capacitive touch screen, or a thermal touch screen. In accordance with an embodiment, the display 214 may receive the input through a virtual keypad, a stylus, a gesture-based input, and/or a touch-based input. In such a case, the input device may be integrated within the display 214. In accordance with an embodiment, the electronic device 102 may include a secondary input device apart from a touch screen based display 214.

In operation, the processor 202 may be configured to detect intent of the user 110 to capture a plurality of images of the user-selected scene by use of the image-capturing unit 212. For example, the user 110 may provide an input at the electronic device 102, via the UI 108 of the image-capturing application, to enable a professional photography mode. The user 110 may then point the electronic device 102 towards the user-selected scene. The user 110 may utilize the viewfinder of the image-capturing unit 212 to compose the user-selected scene. The processor 202 may detect occurrences of events (such as enablement of the professional photography mode and pointing the electronic device 102 towards the user-selected scene) to detect the intent of the user 110 to capture the plurality of images of the user-selected scene.

In accordance with an embodiment, the electronic device 102 may be configured to receive an input to capture the plurality of images. The processor 202 may be configured to capture a first image of the user-selected scene, such as the scene selected by the user 110, using a default scene setting. In accordance with an embodiment, the processor 202 may be configured to determine the geo-location of the electronic device 102. In accordance with an embodiment, the geo-location may be determined when the first image is captured by use of at least one of the sensing devices 208, such as the GPS sensor. In accordance with an embodiment, the geo-location may be determined when the first image is captured by use of at least one of the sensing devices 208, such as the GPS sensor. In accordance with an embodiment, the geo-location may be determined when the electronic device 102 is pointed towards the user-selected scene and/or when the intent of the user 110 is detected to capture the plurality of images of the user-selected scene. The primary memory 204a may comprise at least an image buffer configured to temporarily store the captured first image and/or the image data corresponding to the user-selected scene.

In accordance with an embodiment, the captured first image of the user-selected scene may comprise one or more objects. The electronic device 102 may be configured to determine an object type of the one or more objects based on the analysis of the captured first image or the image data corresponding to the user-selected scene stored in the image buffer. The image buffer of the first image may be analyzed before the capture of other of the plurality of images.

In accordance with an embodiment, the processor 202 may be configured to dynamically determine a scene mode to capture the plurality of images of the user-selected scene.

In accordance with an embodiment, the scene mode may be determined from a pre-stored set of scene modes, based on the determined geo-location and the determined object-type of the one or more objects. In accordance with an embodiment, the scene mode may be determined based on a time of capture and/or a distance from the one or more objects of the first image. In accordance with an embodiment, the scene mode may be determined based on a time when the electronic device 102 is pointed towards the user-selected scene and/or when the intent of the user 110 is detected to capture the plurality of images of the user-selected scene. In accordance with an embodiment, the scene mode may be determined based on a distance from the one or more objects detected in the image data corresponding to the user-selected scene. The pre-stored set of scene modes may comprise one or more user-defined scene modes and/or manufacturer defined scene modes (or "default scene modes"). Examples of the pre-stored set of scene modes may include, but are not limited to, an indoor scene mode, a party scene mode, an outdoor scene mode, a night portrait scene mode, a portrait scene mode, a beach scene mode, a snow scene mode, a landscape, a sunset scene mode, a theatre scene mode, a fireworks scene mode, a waterfall scene mode, a birthday scene mode, a sports action scene mode, and/or a bird-watch scene mode.

In accordance with an embodiment, the processor 202 may be configured to capture the plurality of images based on the determined scene mode. Each image of the plurality of images may be captured by use of different photography settings (user-defined photography settings) for the determined scene mode. In addition to the user-defined photography settings, the photography settings may further include system-generated photography settings (by the electronic device 102) and/or retrieved photography settings (from the server 104), as explained below.

In certain instances, the user-defined photography settings may not be available for certain scene modes, such as the determined scene mode. In such instances, it may be desirable to use a photography setting pre-defined by other users as an ideal setting for the determined geo-location and the determined scene mode. In such instances, or as per user input, the processor 202 may be configured to retrieve relevant photography settings (relevant for the user-selected scene) for the determined scene mode from the server 104 by use of the transceiver 210, via the communication network 106.

In accordance with an embodiment, the relevant photography settings may be retrieved from the server 104, based on at least a time of capture of the first image. For example, the user 110 may want to capture an ideal image of an iconic landmark in a suitable lighting condition. The user 110 may want to capture at least one image with a desired visual effect. The desired visual effect may be a scene where the background of the iconic landmark is neither too dark (such as a dark-shaded sky), nor too bright (such as a radiant or brightly lit sky). Further, the user 110 may desire to capture the iconic landmark when it is lit by the colorful lights. The iconic landmark may be lit by colorful artificial lights in evening or nighttime. However, the artificial lights may not be put on when there is enough natural light in the morning hours. Thus, images captured in the determined scene mode, such as a "cityscape scene mode", by use of a single user-defined photography setting (that comprises a particular set of settings) at different time of day, may provide varied visual effects. The processor 202 may be configured to receive an input to retrieve a relevant photography setting from the server 104 for an evening time, such as "<between 1600-1900>", for the detected geo-location of the iconic landmark. The retrieved photography setting may correspond to a user-defined photography setting that may be shared by another user. The retrieved photography setting may comprise certain pre-configured values for one or more setting parameters, such as ISO setting of "1500", aperture of "f/3.5", and/or shutter speed of "1/60". The retrieved photography setting may provide a right balance for exposure between natural and artificial light, to capture the image with desired visual effect.

In accordance with an embodiment, the relevant photography settings may be retrieved from the server 104 further based on an orientation of the electronic device 102, detected by the sensing devices 208. In accordance with an embodiment, the relevant photography settings may be retrieved at the time of capture of the first image. In accordance with an embodiment, the relevant photography settings may be retrieved when the electronic device 102 is pointed towards the user-selected scene and/or when the intent of the user 110 is detected to capture the plurality of images of the user-selected scene.

Similarly, the processor 202 may be configured to retrieve the relevant photography settings further in combination of one or more other parameters, such as the detected geo-location of the electronic device 102, the determined scene mode, and/or the determined object type of the one or more objects in the user-selected scene. In accordance with an embodiment, a request may be sent from the electronic device 102 to the server 104 to retrieve the relevant photography settings. The request may include one or more search parameters for the retrieval of the relevant photography settings. Examples of the search parameters may be the detected geo-location of the electronic device 102, the determined scene mode, and/or the detected one or more objects in the user-selected scene. The search parameters may further include a time of capture of the first image, a time of detection of the intent of the user 110 to capture the plurality of images, an orientation of the electronic device 102, and/or the determined object type(s) for the one or more objects in the user-selected scene. The relevant photography settings may be retrieved by use of the UI 108 rendered on the display 214 of the electronic device 102. In accordance with an embodiment, the relevant photography settings may be retrieved when the professional photography mode is enabled at the UI 108.

In accordance with an embodiment, the processor 202 may be configured to predict and subsequently generate one or more optimal photography settings. The prediction of one or more optimal photography settings may be based on the time of capture of the plurality of images, the orientation of the electronic device 102, the detected geo-location of the electronic device 102, the determined scene mode, and/or the determined object-type of the one or more objects.

In accordance with an embodiment, the electronic device 102 may be configured to recommend capture of one or more images by use of the generated one or more optimal photography settings to the user 110. The one or more images may be recommended to be captured in addition to a certain count of the photography settings stored (for the determined scene mode) in the secondary memory 204b. Such prediction and recommendation may occur based on an analysis of the user-defined photography settings and/or the retrieved photography settings from the server 104. For instance, based on the analysis, the electronic device 102 may determine that quality of the plurality of images captured by use of the user-defined photography settings and/or the retrieved photography settings is below an image quality threshold. The image quality threshold may be predefined based on known techniques of image quality assessment. Examples of the known techniques of image quality assessment may include, but are not limited to, a full reference method, a no reference method, and/or a reduced reference method. In accordance with an embodiment, the quality of the plurality of images may be determined based on various professional photography techniques. Various rules, based on the knowledge of the professional photography techniques, may be pre-configured via the UI 108, and stored at the secondary memory 204*b*. In an example, the rule may be an appropriate combination of aperture value, a shutter speed value, and an exposure value to capture an optimal image.

In accordance with an embodiment, the processor 202 in the electronic device 102, such as a smartphone, may be configured to utilize a photography setting shared by another electronic device, such as another smartphone, to capture at least an image of the user-selected scene. In accordance with an embodiment, the processor 202 may be configured to capture the plurality of images for the determined scene mode. The plurality of images for the determined scene mode may be based on the received input. For example, a single input may trigger capture of multiple images, such as twenty images. Out of the twenty captured images, fifteen images may be captured by use of different user-defined photography settings, three images may be captured by use of the system-generated photography settings, and two images may be captured by use of the relevant photography settings received from the server 104. Thus, as described above, this may further increase the degree of certainty for capture of one or more ideal images out of the twenty images.

In accordance with an embodiment, the processor 202 may define an association between the captured plurality of images and the corresponding photography settings. In accordance with an embodiment, the processor 202 may be configured to tag the photography settings, used at the time of capture of the plurality of images, with corresponding metadata. The metadata may correspond to information related to the time of capture of the plurality of images, the orientation of the electronic device 102, the detected geo-location of the electronic device 102, the determined scene mode, and/or the detected one or more objects in the user-selected scene.

In accordance with an embodiment, the processor 202 may be configured to display the captured plurality of images, via the UI 108 at the electronic device 102. The UI 108 may enhance visualization, deletion, and/or navigation between the captured plurality of images. Each image of the plurality of images may be associated with the corresponding photography setting used at the time of capture of the image. The captured image and its corresponding photography setting may be simultaneously displayed on the UI 108. The user 110 may select or like a desired image or the displayed corresponding photography setting among the plurality of images and corresponding photography settings from the UI 108. The processor 202 may be configured to control display of the captured plurality of images at the UI 108 in a user-friendly manner with attributes (such as a qualifier) to distinguish the plurality of images captured with different photography settings from normal images.

In accordance with an embodiment, the processor 202 may be configured to learn from at least the selected photography settings and corresponding metadata. The learning from the selected photography settings and the corresponding metadata may be utilized for the prediction of the one or more optimal photography settings. The learning from the selected photography settings and the corresponding metadata may be further utilized for the generation of the recommendations, as described above. In accordance with an embodiment, the processor 202 may be configured to share the photography settings (tagged with the metadata) with the server 104, by use of the UI 108. The shared photography settings may be associated with one or more images selected from the captured plurality of images.

Figure 3:
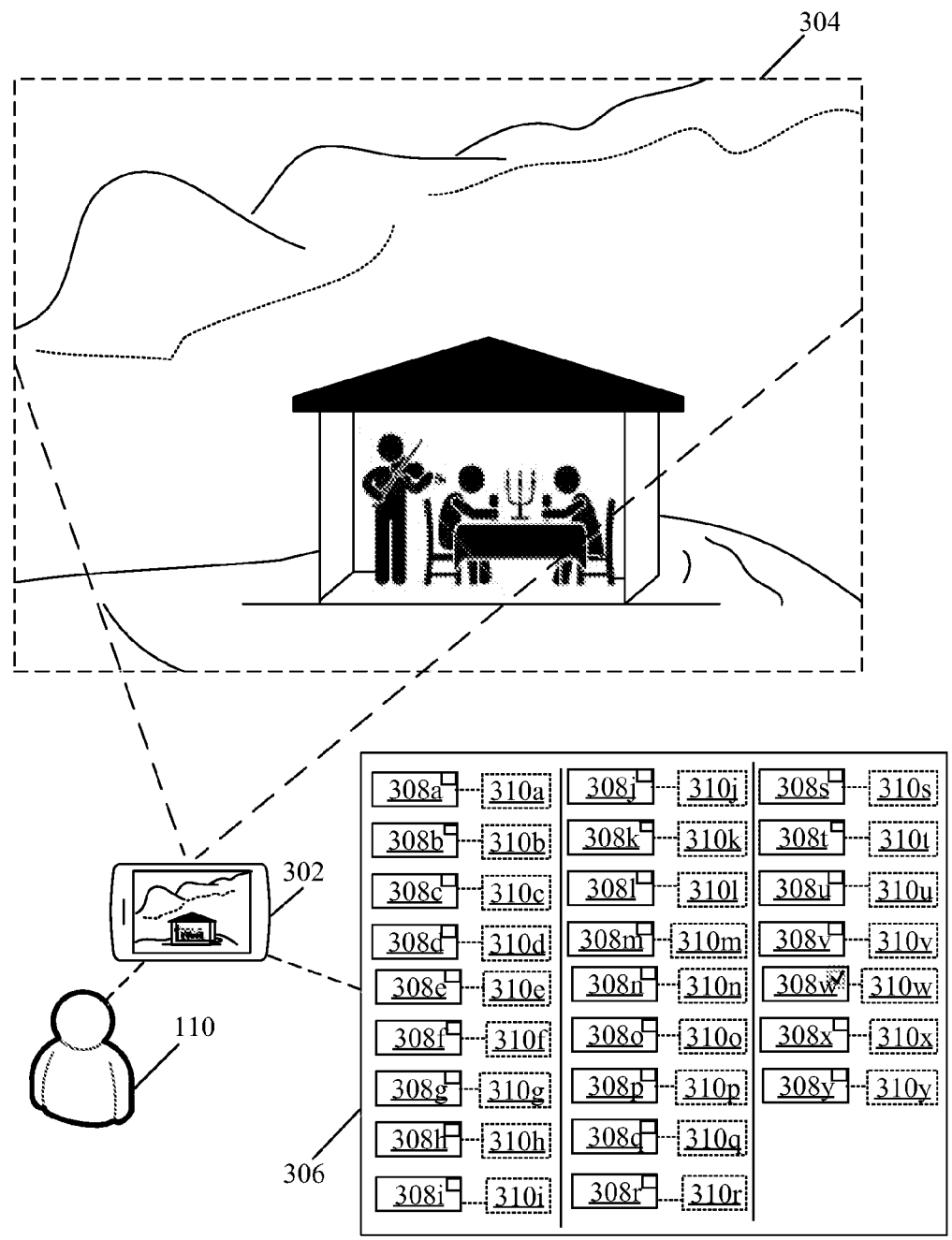
FIG. 3 illustrates a first exemplary scenario for implementation of the disclosed system and method to control capture of images, in accordance with an embodiment of the disclosure.

FIG. 3 illustrates an exemplary scenario for the implementation of the disclosed system and method to control capture of images, in accordance with an embodiment of the disclosure. FIG. 3 is explained in conjunction with elements from FIG. 1 and FIG. 2. With reference to FIG. 3, there is shown a smartphone 302, a schematic representation of a real-world scene, such as a scene 304, and a user interface (UI) 306. There is further shown a plurality of images 308*a* to 308*y* and corresponding photography settings 310*a* to 310*y*, rendered at the UI 306.

In accordance with the exemplary scenario, the smartphone 302 may have functionalities similar to that of the electronic device 102. The UI 306 may correspond to the UI 108 of the electronic device 102 (FIG. 2). The smartphone 302 may comprise certain number of the photography settings, such as twenty photography settings 310*a* to 310*t*, configured by the user 110. The twenty photography settings 310*a* to 310*t* may correspond to a certain user-defined scene mode, such as "candlelight dinner". The user 110 may have pre-defined and stored the different user-defined photography settings 310*a* to 310*t*, by use of the UI 306. The user 110 may want to capture an important moment, such as a toast-raising ceremony at the anniversary dinner of his parents at a famous hilltop restaurant, as shown in the scene 304. For the scene 304, determination of a certain visual effect or background light of the scene may not be appropriate, as some objects (such as a roof surface and background walls of the restaurant) may not be favorable to create a desired visual effect. For example, the roof surface may be a thatched roof and the green color of paint of the background walls in the scene 304 may not be suitable for a bounce flash. It may be difficult to adjust different photography settings parameters manually between each shot. This may hamper the ability to capture the desired image with the desired visual effect at the desired moment.

In operation, the smartphone 302 may be configured to receive an input by use of the UI 306, to capture the plurality of images 308*a* to 308*t*. The smartphone 302 may be configured to dynamically determine a scene mode, such as a user-defined "hilltop candlelight dinner scene mode". The smartphone 302 may determine the scene mode when the user 110 points the smartphone 302 towards the scene 304, to capture the plurality of images 308*a* to 308*y* of the scene 304. Alternatively, the scene mode may be determined when the first image, such as the image 308*a*, is captured. The determination of the scene mode from a set of scene modes pre-stored at the smartphone 302 may be based on object types of the one or more objects in the scene 304 and the geo-location of the smartphone 302.

The smartphone 302 may be configured to determine whether the number of captured images is less than the number of the user-defined photography settings. In instances when the number of captured images is less than the number of the user-defined photography settings for the determined scene mode, the smartphone 302 may be configured to capture another image by use of another user-defined photography setting. For instance, the number of images captured 308*a* to 308*t* may be equal to the number of user-defined photography settings 310a to 310t. Each image 308a to 308y in the determined scene mode may be captured by use of different photography settings 310a to 310y. For example, a first image, such as the image 308a, of the plurality of images 308a to 308y, may be captured with a user-defined photography setting 310a. The user-defined photography setting 310a may include a first set of photography setting parameters configured with certain values, such as ISO setting of "800", shutter speed of "1/60s", and flash exposure of "+2" compensation. A second image of the plurality of images, such as the image 308b, may be automatically captured with a user-defined photography setting 310b. The user-defined photography setting 310b may include a second set of photography setting parameters configured with certain other values, such as ISO setting of "900", shutter speed of "1/150s", and flash exposure of "+2" compensation. Similarly, twenty different images 308a to 308t, by use of twenty different user-defined photography settings 310a to 310t, may be captured in quick succession with different visual effects. Such capture of the twenty images 308a to 308t with different visual effects may not be possible by use of a "burst mode" known to a person with ordinary skill in the art. The "burst mode" may provide numerous images for the scene 304 but an ideal scene mode may not be determined, as described above. Further, the "burst mode" may not provide a capability to use a different user-defined photography setting to capture each of the plurality of images, such as the twenty images 308a to 308t, for the determined scene mode. Further, none of the captured images in the "burst mode" may provide an optimum image due to ambient visual interference, such as the green walls, in accordance with the above exemplary scenario.

In accordance with an embodiment, the smartphone 302 may be configured to capture additional images (such as additional five images 308u to 308y) of the scene 304, in addition to the already captured images (such as the twenty images 308a to 308t). The capture of additional images may occur when the smartphone 302 determines that an ideal image is not captured by use of the user-defined photography settings. The smartphone 302 may be configured to analyze the user-defined photography settings and subsequently predict and generate additional photography settings different from the previously stored user-defined photography settings. Thus, the captured plurality of images, such as twenty five images (the twenty images 308a to 308t by use of user-defined photography settings 310a to 310t, and the five images 308u to 308y by use of the system-generated photography settings 310u to 310y), may provide a balanced set of images.

The captured plurality of images 308a to 308y may be displayed simultaneously with corresponding photography settings 310a to 310y. The image 308w (as displayed via the UI 306) may be an optimal image that may exemplify the desired visual effect for the determined object type, such as people in a restaurant, and the geo-location, such as the hilltop restaurant, in the scene 304. The user 110 may like the optimal image 308w as an indication of the selection of the best shot. The photography setting 310w tagged with metadata and associated with the optimal image 308w may be automatically selected. The other images 308a to 308v, 308x, and 308y may further be automatically deleted in response to the liked photography setting 310w. The selected photography setting 310w may be shared with another smartphone or uploaded to the server 104, for use by another user. Thus, a professional photography experience may be provided to the user 110 to capture an ideal image, such as the image 308w, for the important moment with a certain degree of certainty.

Figure 4A:
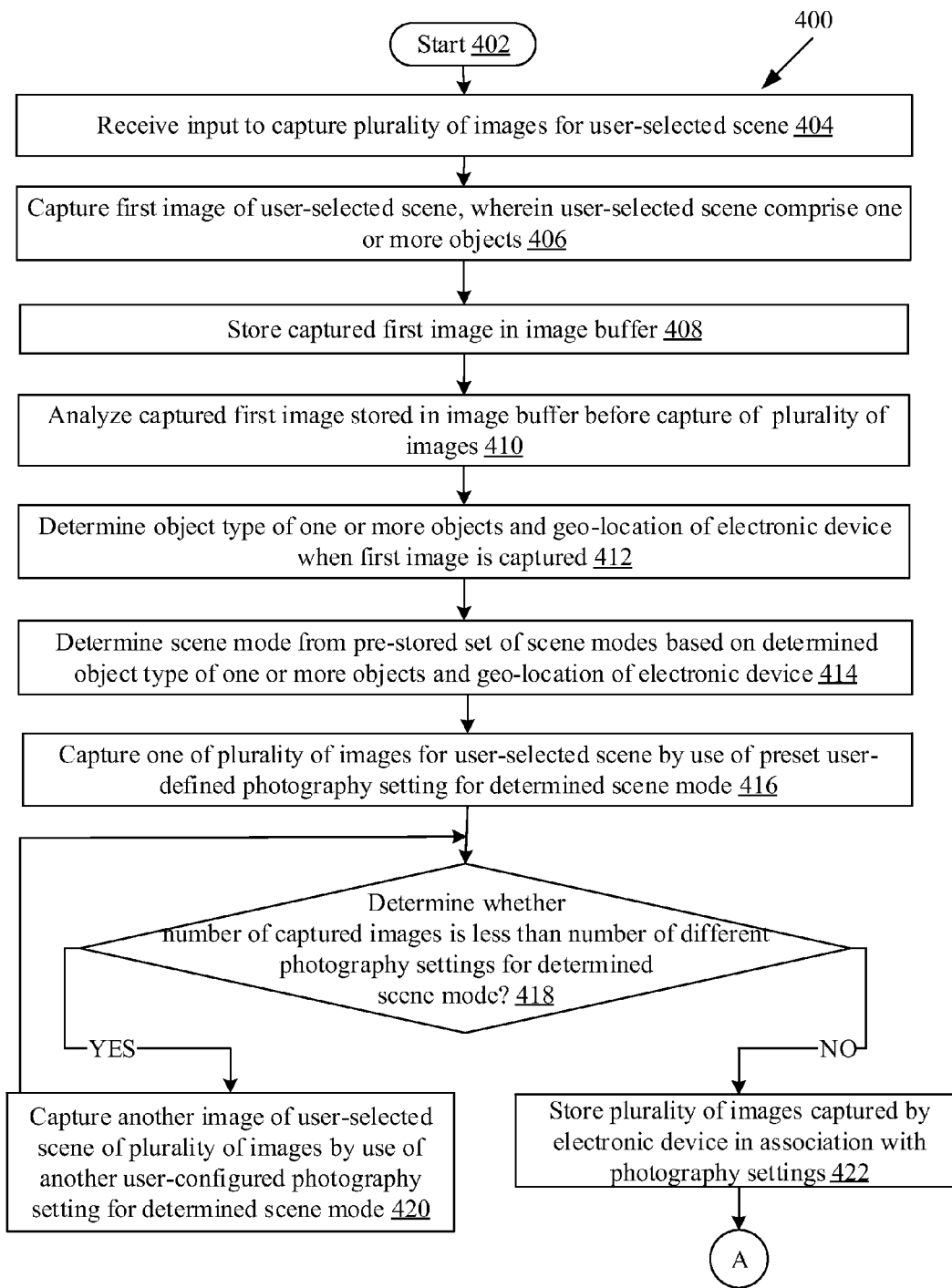
FIGS. 4A and 4B collectively depict a first flow chart that illustrates an exemplary method to control capture of images, in accordance with an embodiment of the disclosure.
Figure 4B:
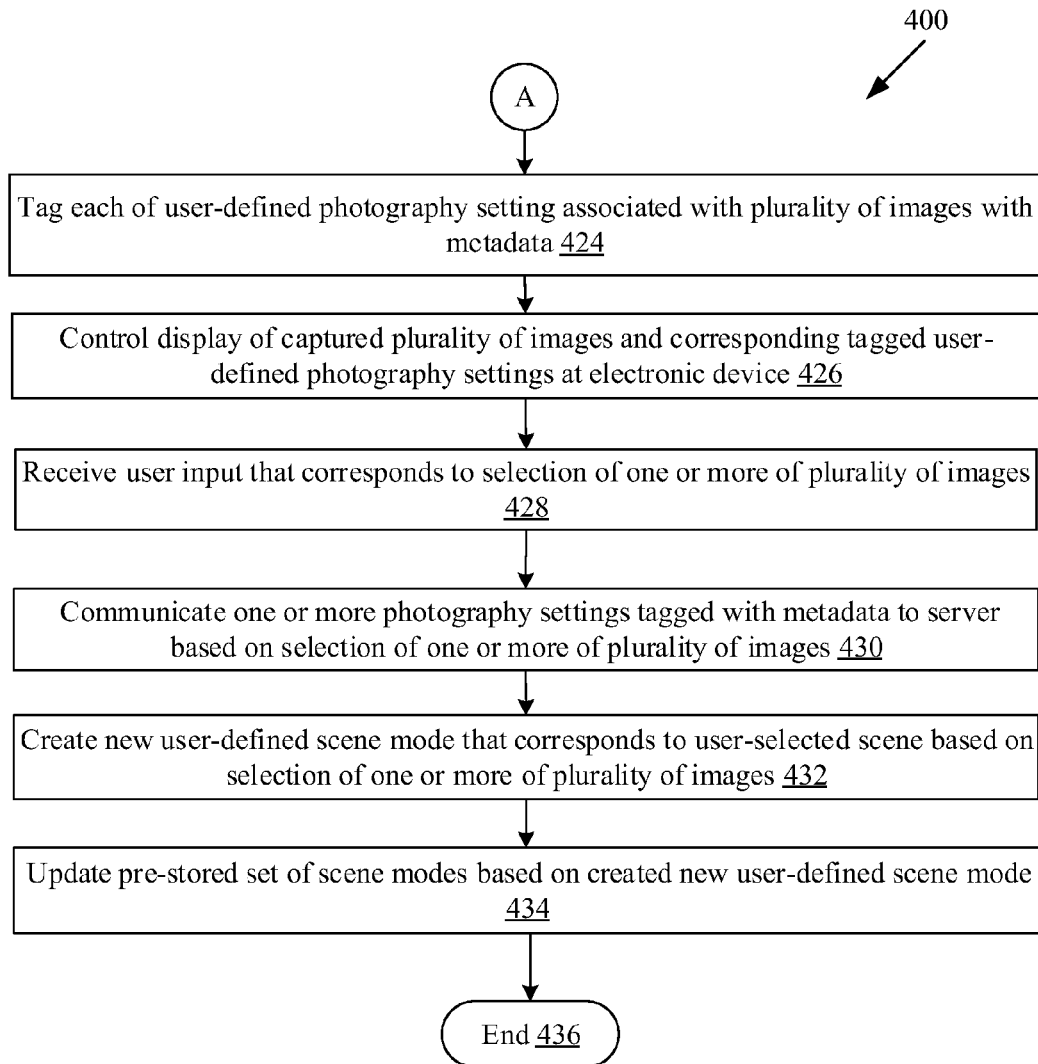

FIGS. 4A and 4B collectively depict a first flow chart that illustrates an exemplary method to control capture of images, in accordance with an embodiment of the disclosure. With reference to FIGS. 4A and 4B, there is shown a flow chart 400. The flow chart 400 is described in conjunction with FIGS. 1, 2 and 3. The method starts at step 402 and proceeds to step 404.

At step 404, an input may be received to capture the plurality of images for a user-selected scene, such as the scene 304, visualized via the electronic device 102 by a user, such as the user 110. The input may be received via a user interface, such as the UI 108 or the UI 306 (FIG. 3). At step 406, a first image, such as the image 308a, of a user-selected scene, such as the scene 304, visualized by the user 110 may be captured. The user-selected scene may comprise one or more objects.

At step 408, the captured first image may be stored in an image buffer. At step 410, the captured first image stored in the image buffer may be analyzed by the electronic device 102. The image buffer may be analyzed before the capture of the plurality of images.

At step 412, an object type of each of the one or more objects and a geo-location of the electronic device 102 may be determined when the first image is captured. The determination of the object type of the one or more objects may be based on the analysis of the captured first image stored in the image buffer. At step 414, a scene mode, such as the user created scene mode, "hilltop candlelight dinner scene mode", from a pre-stored set of scene modes may be determined when the first image is captured. The scene mode may be determined based on the determined object type of the one or more objects and the geo-location of the electronic device 102. The scene mode may be determined to capture the plurality of images of the user-selected scene in the determined scene mode.

In an instance, the first image may not be required to be captured. In such an instance, the object type of each of the one or more objects and the geo-location of the electronic device 102 may be determined when the electronic device 102 is pointed towards the user-selected scene and/or when the intent of the user 110 is detected to capture the plurality of images of the user-selected scene. Further, in such an instance, the scene mode may also be determined, when the electronic device 102 is pointed towards the user-selected scene and/or when the intent of the user 110 is detected to capture the plurality of images of the user-selected scene, as described above.

At step 416, one image of the plurality of images for the user-selected scene may be captured by use of a preset user-defined photography setting for the determined scene mode. At step 418, it may be determined whether the number of captured images is less than the number of different user-defined photography settings stored at the electronic device 102 for the determined scene mode.

In instances when the number of captured images is less than the number of the user-defined photography settings for the determined scene mode, the control passes to step 420. In instances when the number of captured images is equal to the number of the different photography settings for the determined scene mode, the control passes to step 422.

At step 420, another image of the plurality of images may be captured by another user-defined photography setting for the determined scene mode. The control may pass back to the step 418 until the number of captured images is equal to the number of the different user-defined photography settings. Each image of the plurality of images may be captured by use of different photography settings, such as the photography settings 310a to 310t, for the determined scene mode. The different photography settings may be user-defined photography settings 310a to 310t that may comprise a set of photography setting parameters.

At step 422, the plurality of images captured by the electronic device 102 may be stored at the electronic device 102. At step 424, each of the user-defined photography settings associated with the plurality of images may be tagged with the metadata. The metadata may correspond to a time of capture of the plurality of images, an orientation of the electronic device 102, the geo-location of the electronic device 102, the determined scene mode, and/or the determined object type of the one or more objects in the user-selected scene.

At step 426, display of the captured plurality of images and corresponding tagged user-defined photography settings may be controlled at the electronic device 102, via a user interface, such as the UI 108 or UI 306. At step 428, user input may be received that corresponds to a selection of one or more of the plurality of images. The selected one or more of the plurality of images, such as the image 308w, may be associated with corresponding one or more photography settings, such as the photography setting 310w, tagged with the metadata. The selection may be via the UI 108 (or the UI 306) to indicate that the one or more photography settings may be ideal to capture the user-selected scene.

At step 430, one or more photography settings tagged with the metadata may be communicated to a server, such as the server 104, based on the selection of the one or more of the plurality of images. At step 432, a new user-defined scene mode that corresponds to the user-selected scene may be created. The new user-defined scene mode may be created based on the selection of the one or more of the plurality of images. The new user-defined scene mode may correspond to a particular group of user-defined photography settings, such as the photography settings 310a to 310t, used to capture the user-selected scene by the electronic device 102 at the geo-location. At step 434, the pre-stored set of scene modes may be updated based on the created new user-defined scene mode. The control passes to end step 436.

Figure 5:
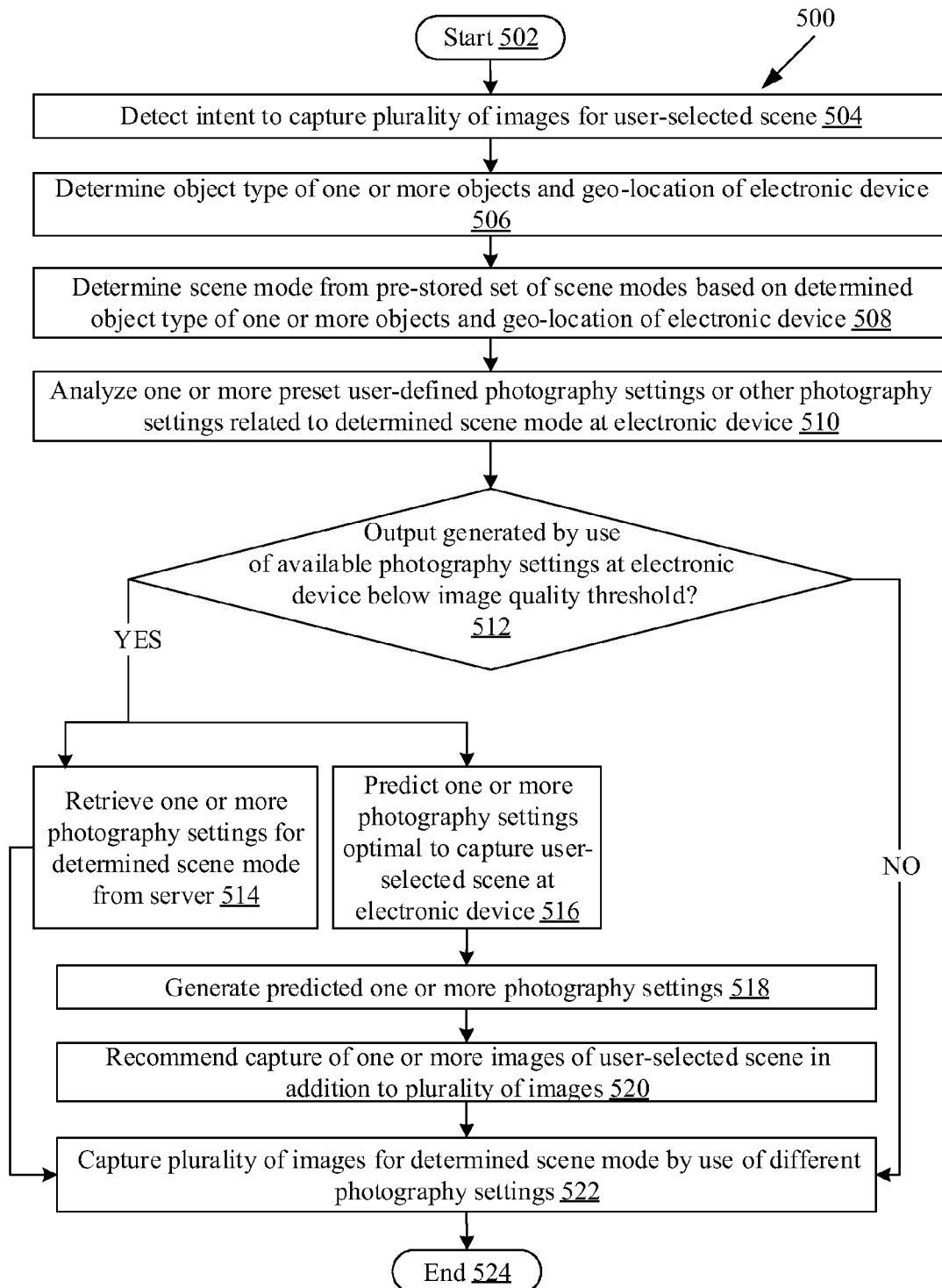
FIG. 5 is second flow chart that illustrates another exemplary method to control capture of images, in accordance with an embodiment of the disclosure.

FIG. 5 is a second flow chart that illustrates another exemplary method to control capture of images, in accordance with an embodiment of the disclosure. With reference to FIG. 5, there is shown a flow chart 500. The flow chart 500 is described in conjunction with FIGS. 1, 2 and 3. The method starts at step 502 and proceeds to step 504.

At step 504, an intent to capture a plurality of images for a scene, such as the scene 304, which may be focused or visualized via the electronic device 102, may be detected. The focused or visualized scene may be referred to as a user-selected scene. The user-selected scene may comprise one or more objects. At step 506, a geo-location of the electronic device 102, and/or an object type of one or more objects in the user-selected scene, may be determined. In accordance with an embodiment, the geo-location of the electronic device 102 and the object type of one or more objects may be determined when the electronic device 102 is pointed towards the user-selected scene to focus or visualize the user-selected scene or when the intent of the user 110 is detected to capture the plurality of images of the user-selected scene.

At step 508, a scene mode from a pre-stored set of scene modes may be determined. The scene mode may be determined based on the determined object type of the one or more objects and the geo-location of the electronic device 102. The scene mode may be determined to capture the plurality of images of the user-selected scene in the determined scene mode. In accordance with an embodiment, the scene mode may be determined when the electronic device 102 is pointed towards the user-selected scene to focus or visualize the user-selected scene or when the intent of the user 110 is detected to capture the plurality of images or at least one or more images of the user-selected scene. In accordance with an embodiment, the scene mode may be determined based on an input from a user, such as the user 110, to capture the plurality of images for a scene, such as the scene 304, which may be focused or visualized via the electronic device 102, as described previously in the FIGS. 1, 2, 4A, and 4B (the first flow chart).

At step 510, one or more user-defined photography settings or other photography settings related to the determined scene mode at the electronic device 102 may be analyzed. At step 512, based on the analysis, it may be determined that an output generated by use of the available photography settings at the electronic device 102 may be below an image quality threshold.

In instances when it is determined that the output generated by use of the available photography settings is below an image quality threshold, the control may pass to the step 514 and 516 in a parallel process. In accordance with an embodiment, the control passing to the step 514 or the step 516 may be based on a pre-configured user-preference setting at the electronic device 102. In instances, when it is determined that the output generated by use of the available photography settings is equal to or above an image quality threshold, the control passes to the step 522.

At step 514, one or more photography settings for the determined scene mode may be retrieved from a server, such as the server 104, via the communication network 106. The one or more photography settings may be retrieved, based on a time of capture of the plurality of images, an orientation of the electronic device 102, the geo-location of the electronic device 102, the determined object type of the one or more objects in the user-selected scene, and/or the determined scene mode. The control may pass to the step 522.

At step 516, one or more photography settings that may be optimal to capture the user-selected scene may be predicted at the electronic device 102. The one or more photography settings may be predicted by the image-capturing application, based on the analysis of the available user-defined photography settings, or the retrieved photography setting stored at the electronic device 102 and/or based on learned data. The prediction of one or more optimal photography settings may utilize one or more criteria that may include the time of capture of the plurality of images, the orientation of the electronic device 102, the detected geo-location of the electronic device 102, the determined scene mode, and/or the determined object-type of the one or more objects.

At step 518, the predicted one or more photography settings, such as the photography settings 310u to 310y, may be generated at the electronic device 102. At step 520, capture of one or more images of the user-selected scene, such as the scene 304, in addition to the plurality of images may be recommended. The one or more images of the scene may be recommended to capture by use of the generated one or more photography settings 310u to 310y. Such prediction and recommendation may occur based on an analysis of the user-defined photography settings 310b to 310t and/or the retrieved photography settings from the server 104.

At step 522, the plurality of images may be captured for the determined scene mode by use of different photography settings. The capture of plurality of images for the determined scene mode may be in response to the received input (such as a single press of a software button or a shutter button at the electronic device 102). Each image of the plurality of images may be captured by use of one of: the user-defined photography settings stored at the electronic device 102, the one or more system-generated photography settings recommended by the electronic device 102, the photography settings retrieved from the server 104, and/or a photography setting shared by another electronic device. The plurality of images captured by use of different photography settings may depict different visual effects. The control may pass to end step 524.

In an instance, the recommendation of the one or more photography settings by the electronic device 102, the retrieval of the photography settings from the server 104 or receipt of a photography setting shared by another electronic device, may be performed before the receipt of the input to capture the plurality of images for user-selected scene (as described above in the step 504). In such an instance, the recommendation or the retrieval may occur in response to a user input via the UI 108. The user input may be provided by the user 110 as per user choice or after completion of configurations for the user-defined photography settings.

In accordance with an embodiment of the disclosure, a system to control capture of images is disclosed. The system (such as the electronic device 102 (FIG. 1) may comprise one or more circuits (hereinafter referred to as the processor 202 (FIG. 2)). The processor 202 may be configured to capture of a first image of a user-selected scene. The user-selected scene may comprise one or more objects. The processor 202 may be configured to determine a scene mode from a pre-stored set of scene modes to capture a plurality of images of the user-selected scene based on an object type of the one or more objects and a geo-location of the electronic device 102 when the first image is captured.

Various embodiments of the disclosure may provide a non-transitory computer readable medium and/or storage medium, and/or a non-transitory machine readable medium and/or storage medium having stored thereon, a machine code and/or a set of instructions executable by a machine, such as the electronic device 102, and/or a computer to control capture of images. The set of instructions in the electronic device 102 may cause the machine and/or computer to perform the steps that comprise capture of a first image of a user-selected scene. The user-selected scene may comprise one or more objects. A scene mode from a pre-stored set of scene modes may be determined by the electronic device 102 to capture a plurality of images of the user-selected scene. The determination of the scene mode may be based on an object type of the one or more objects and a geo-location of the electronic device 102 when the first image is captured.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that may enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system, comprising:
circuitry in an electronic device, said circuitry configured to:
capture a first image of a plurality of images of a user-selected scene, wherein said user-selected scene comprises an object;
determine a scene mode from a set of scene modes based on a type of said object and a geo-location of said electronic device, wherein said determined scene mode is associated with a plurality of photography settings;
capture remaining images of said plurality of images of said user-selected scene based on said plurality of photography settings, wherein
each of said plurality of photography settings comprises a set of photography setting parameters,
a second image of said captured remaining images of said plurality of images is associated with a first photography setting of said plurality of photography settings,
a third image of said captured remaining images of said plurality of images is associated with a second photography setting of said plurality of photography settings, and
said first photography setting and said second photography setting include different values for at least one of said set of photography setting parameters;
determine that a quality of said plurality of images is less than an image quality threshold;
generate at least one optimal photography setting based on an orientation of said electronic device, said determined scene mode, said type of said object in said user-selected scene, and said determination that said quality of said plurality of images is less than said image quality threshold; and
capture at least one additional image different from said plurality of images based on said generated at least one optimal photography setting.

2. The system according to claim 1, wherein said set of scene modes comprises at least one of an indoor scene mode, a party scene mode, an outdoor scene mode, a night portrait scene mode, a portrait scene mode, a beach scene mode, a snow scene mode, a landscape scene mode, a waterfall scene mode, a birthday scene mode, a sports action scene mode, a bird-watch scene mode, or a user-defined scene mode.

3. The system according to claim 1, further comprising an image buffer configured to store said captured first image.

4. The system according to claim 3, wherein
said circuitry is further configured to determine said type of said object in said user-selected scene based on an analysis of said captured first image stored in said image buffer, and
said analysis of said captured first image is before said capture of said remaining images of said plurality of images.

5. The system according to claim 1, wherein said circuitry is further configured to receive an input to capture said plurality of images.

6. The system according to claim 5, wherein said set of photography setting parameters comprises at least one of a red-eye correction, an automatic gain setting, a shooting mode to establish an aperture priority with respect to a shutter-priority, a shutter speed, an aperture size, a lens focal length, a flash operation, a white balance, International Organization of Standardization (ISO) setting to adjust sensitivity to light, or a manual control.

7. The system according to claim 5, wherein said circuitry is further configured to tag each of said plurality of photography settings, associated with said plurality of images, with metadata.

8. The system according to claim 7, wherein said metadata comprises at least one of a time of capture of said plurality of images, said orientation of said electronic device, said geo-location of said electronic device, said determined scene mode, or said type of said object in said user-selected scene.

9. The system according to claim 7, wherein said circuitry is further configured to select at least one image of said captured remaining images based on a user operation.

10. The system according to claim 9, wherein
said circuitry is further configured to communicate at least one photography setting of said plurality of photography settings tagged with said metadata to a server, and
said communication is based on said selection of said at least one image of said captured remaining images.

11. The system according to claim 9, wherein
said circuitry is further configured to create a user-defined scene mode corresponding to said user-selected scene based on said selection of said at least one image of said captured remaining images, and
said user-defined scene mode corresponds to a group of photography settings, of said plurality of photography settings, used to capture said user-selected scene by said electronic device at said geo-location.

12. The system according to claim 11, wherein said circuitry is further configured to update said set of scene modes based on said user-defined scene mode.

13. A system, comprising:
circuitry in an electronic device, said circuitry configured to:
receive image data of a user-selected scene focused via said electronic device, wherein said user-selected scene comprises an object;
determine a scene mode from a set of scene modes based on a type of said object and a geo-location of said electronic device, wherein
said type of said object and said geo-location are based on said image data, and
said determined scene mode is associated with a plurality of photography settings;
capture a plurality of images of said user-selected scene based on said plurality of photography settings, wherein
each of said plurality of photography settings comprises a set of photography setting parameters,
a first image of said plurality of images is associated with a first photography setting of said plurality of photography settings,
a second image of said plurality of images is associated with a second photography setting of said plurality of photography settings, and
said first photography setting and said second photography setting include different values for at least one of said set of photography setting parameters;
determine that a quality of said plurality of images is less than an image quality threshold;
generate at least one optimal photography setting based on an orientation of said electronic device, said determined scene mode, said type of said object in said user-selected scene, and said determination that said quality of said plurality of images is less than said image quality threshold; and
capture at least one additional image different from said plurality of images based on said generated at least one optimal photography setting.

14. A server, comprising:
circuitry communicatively coupled to a first electronic device, said circuitry configured to:
receive a plurality of photography settings tagged with metadata from said first electronic device, wherein
each of said plurality of photography settings comprises a set of photography setting parameters,
said first electronic device determines a scene mode from a set of scene modes, and
said plurality of photography settings is associated with said determined scene mode;
create a user-defined scene mode based on said plurality of photography settings, wherein
said user-defined scene mode corresponds to a group of photography settings of said plurality of photography settings,
said group of photography settings is used to capture a user-selected scene by said first electronic device at a geo-location, and
said first electronic device further determines a type of an object in said user-selected scene; and
update said set of scene modes at said server based on said user-defined scene mode, wherein
a plurality of images of said user-selected scene is captured by said first electronic device based on said plurality of photography settings,
a first image of said plurality of images is associated with a first photography setting of said plurality of photography settings,
a second image of said plurality of images is associated with a second photography setting of said plurality of photography settings,
said first photography setting and said second photography setting include different values for at least one of said set of photography setting parameters, said first electronic device further:
  determines that a quality of said plurality of images is less than an image quality threshold,
  generates at least one optimal photography setting based on an orientation of said first electronic device, said determined scene mode, said type of said object in said user-selected scene, and said determination that said quality of said plurality of images is less than said image quality threshold, and
  captures at least one additional image different from said plurality of images based on said generated at least one optimal photography setting.

15. The server according to claim 14, wherein
said circuitry is further configured to transmit, to at least one of said first electronic device or a second electronic device, at least one of said user-defined scene mode or said plurality of photography settings, and
said transmission is based on at least one of a time of capture of said plurality of images, said orientation of said first electronic device, said geo-location of said first electronic device, said determined scene mode of said set of scene modes, or said type of said object in said user-selected scene.

16. A method, comprising:
capturing, by an electronic device, a first image of a plurality of images of a user-selected scene, wherein said user-selected scene comprises an object;
determining, by said electronic device, a scene mode from a set of scene modes based on a type of said object and a geo-location of said electronic device, wherein said determined scene mode is associated with a plurality of photography settings;
capturing, by said electronic device, remaining images of said plurality of images of said user-selected scene based on said plurality of photography settings, wherein
  each of said plurality of photography settings comprises a set of photography setting parameters,
  a second image of said captured remaining images of said plurality of images is associated with a first photography setting of said plurality of photography settings,
  a third image of said captured remaining images of said plurality of images is associated with a second photography setting of said plurality of photography settings, and
  said first photography setting and said second photography setting include different values for at least one of said set of photography setting parameters;
determining, by said electronic device, that a quality of said plurality of images is less than an image quality threshold;
generating, by said electronic device, at least one optimal photography setting based on an orientation of said electronic device, said determined scene mode, said type of said object in said user-selected scene, and said determination that said quality of said plurality of images is less than said image quality threshold; and
capturing, by said electronic device, at least one additional image different from said plurality of images based on said generated at least one optimal photography setting.

17. The method according to claim 16, further comprising storing said captured first image in an image buffer.

18. The method according to claim 17, further comprising determining said type of said object in said user-selected scene based on an analysis of said captured first image stored in said image buffer, wherein said captured first image is analyzed before said capture of said remaining images of said plurality of images.

19. The method according to claim 16, further comprising receiving an input to capture said plurality of images.

20. The method according to claim 19, wherein said set of photography setting parameters comprises at least one of a red-eye correction, an automatic gain setting, a shooting mode to establish an aperture priority with respect to a shutter-priority, a shutter speed, an aperture size, a lens focal length, a flash operation, a white balance, International Organization of Standardization (ISO) setting to adjust sensitivity to light, or a manual control.

21. The method according to claim 16, further comprising tagging each of said plurality of photography settings, associated with said plurality of images, with metadata.

22. The method according to claim 21, wherein said metadata comprises at least one of a time of capture of said plurality of images, said orientation of said electronic device, said geo-location of said electronic device, said determined scene mode, or said type of said object in said user-selected scene.

23. The method according to claim 21, further comprising selecting at least one image of said captured remaining images based on a user operation.

24. The method according to claim 23, further comprising communicating at least one photography setting of said plurality of photography settings tagged with said metadata to a server, wherein said communication is based on said selection of said at least one image of said captured remaining images.

25. The method according to claim 23, further comprising creating a user-defined scene mode corresponding to said user-selected scene based on said selection of said at least one image of said captured remaining images, wherein said user-defined scene mode corresponds to a group of photography settings, of said plurality of photography settings, used to capture said user-selected scene by said electronic device at said geo-location of said electronic device.

26. The method according to claim 25, further comprising updating said set of scene modes based on said user-defined scene mode.

27. A non-transitory computer-readable medium having stored thereon computer-executable instructions that, when executed by a processor of an electronic device, cause said processor to perform operations, said operations comprising:
  capturing, by said electronic device, a first image of a plurality of images of a user-selected scene, wherein said user-selected scene comprises an object;
  determining, by said electronic device, a scene mode from a set of scene modes based on a type of said object and a geo-location of said electronic device, wherein said determined scene mode is associated with a plurality of photography settings;
  capturing, by said electronic device, remaining images of said plurality of images of said user-selected scene based on said plurality of photography settings, wherein
    each of said plurality of photography settings comprises a set of photography setting parameters,
    a second image of said captured remaining images of said plurality of images is associated with a first photography setting of said plurality of photography settings, a third image of said captured remaining images of said plurality of images is associated with a second photography setting of said plurality of photography settings, and said first photography setting and said second photography setting include different values for at least one of said set of photography setting parameters;

determining, by said electronic device, that a quality of said plurality of images is less than an image quality threshold;

generating, by said electronic device, at least one optimal photography setting based on an orientation of said electronic device, said determined scene mode, said type of said object in said user-selected scene, and said determination that said quality of said plurality of images is less than said image quality threshold; and capturing, by said electronic device, at least one additional image different from said plurality of images based on said generated at least one optimal photography setting.

\* \* \* \* \*